United States Patent
Haase

[11] 3,975,973
[45] Aug. 24, 1976

[54] IN-DRUM DRIVE AND SPEED REDUCER

[76] Inventor: Charles A. Haase, 2050 Blueberry Lane, Aurora, Ill. 60538

[22] Filed: Apr. 17, 1973

[21] Appl. No.: 351,975

[52] U.S. Cl. .................................................. 74/805
[51] Int. Cl.² ........................................... F16H 1/28
[58] Field of Search .................... 74/804, 805, 190

[56] References Cited
UNITED STATES PATENTS

| 872,220 | 11/1907 | Boyer | 74/190 |
|---|---|---|---|
| 2,966,078 | 12/1960 | Wright | 74/805 |
| 3,145,585 | 8/1964 | Brown | 74/805 |
| 3,160,032 | 12/1964 | Black | 74/804 |
| 3,710,635 | 1/1971 | Whitehorn | 74/805 X |

FOREIGN PATENTS OR APPLICATIONS

| 534,270 | 3/1941 | United Kingdom | 74/805 |

*Primary Examiner*—Benjamin W. Wyche
*Assistant Examiner*—Frank H. McKenzie, Jr.
*Attorney, Agent, or Firm*—Edwin W. Uren

[57] ABSTRACT

An electric motor for rotatably driving a drum is stationarily disposed within the drum and provided with a pair of bearing surfaces eccentrically and oppositely disposed relative to the center of the motor shaft to which the bearing surfaces are coupled, each eccentric bearing surface supporting an externally toothed wheel having a predetermined number of peripheral teeth engageable with an output ring secured to the inner cylindrical surface of the drum, the output ring having a predetermined greater number of internal teeth than the predetermined number of external teeth of the toothed wheels. Each toothed wheel is provided with a plurality of equally spaced-apart apertures disposed along a common radius from the associated bearing surface, the corresponding apertures of each wheel being restrained rotationally by a roller passing therethrough and carried by a shaft forming a part of the stationary frame structure supporting the motor, the diameter of each aperture being equal to the diameter of its restraining roller plus twice the eccentric distance between the center of the bearing surface and the center of the motor shaft, whereby each revolution of the motor shaft will produce an eccentric non-revolving motion of the toothed wheels to thereby rotate the drum a distance equal to the excess of the number of teeth in the output ring over the number of teeth in the toothed wheels.

5 Claims, 5 Drawing Figures

IN-DRUM DRIVE AND SPEED REDUCER

CROSS-REFERENCE TO RELATED APPLICATIONS

The present invention represents a further advancement in the conveyor system art over the single drum system disclosed in a patent application titled "Single-Drum Conveyor Belt" by Charles A. Haase, the present applicant, the referenced application having been filed on June 26, 1972 and assigned Ser. No. 266,204 now U.S. Pat. No. 3,817,355.

BACKGROUND OF THE INVENTION

As indicated in the referenced application titled "Single-Drum Conveyor Belt," conventional article conveyor systems of the type commonly used at cashier or check-out stations in supermarkets and the like have generally been characterized by the use of two cylindrical drums for each belt, one of the drums being a driven drum and the other an idling drum serving primarily to define the path of travel of the belt, to provide the required belt tautness, and to adjustably provide the necessary frictional contact of the belt against the driven drum.

With the above referenced single-drum concept, the disadvantages of the conventional two-drum systems have effectively been overcome, such disadvantages having been perceived in the area of high manufacturing costs stemming from the second drum requirement and the rigid frame structure and intricate adjustment means required for establishing the required belt tautness, and in the area of high maintenance costs stemming from the time and labor that is required for changing belts and for adjusting and maintaining proper tension and balance.

Although the single-drum conveyor belt system overcomes these long-prevailing cost disadvantages, the requirement of an external motor and a connecting drive chain or belt, which has also characterized conventional conveyor systems, has still remained, such requirement presenting additional disadvantages particularly when available space for a conveyor installation is limited or when the system is to be installed in an area where dust or other foreign particles are likely to collect on the motor and the connecting belt or chain. The use of an external motor for driving the driven drum has further tended to be objectionable, especially in those instances where the motor might be subject to slight displacement during the course of usage, and the belt subject to stretching or the chain to deterioration.

SUMMARY OF THE INVENTION

It is accordingly an object of the present invention to make available for conveyor belt installations, or any other kindred use, drum drive means that is disposed within the drum itself, thereby conserving valuable space in the installation area.

It is another object of the invention to eliminate those maintenance and repair costs that have characterized external-drive type drum installations, such repair costs having occurred as a result of inadvertent displacement of the external motor or accidental damage to the chain or belt connecting the external motor to the drum.

It is a further object of the invention to provide a rotatable driven drum having interiorly disposed drive means, wherein the drive means is protected from both inadvertent physical damage and from gradual deterioration resulting from the accumulation of dust and dirt on the motor and connecting chain or belt thereof.

An important aspect of the invention is the provision of a stationary motor-supporting frame structure suitable for containment within a rotatable cylindrical drum, the frame structure including a pair of outboard shaft stubs externally securable to prevent rotation of the frame and motor, an electric supply wire of the motor passing through a central opening formed in one of the shaft stubs, each of the end walls of the cylindrical drum being provided with a fixed bearing disposed in rotatable and running fit relationship relative to its corresponding shaft stub, whereby the cylindrical drum may be rotated by the motor independently of the frame structure while at the same time being supported thereby.

Another important aspect of the present invention is the provision of an eccentric crank shaft that is coupled to the motor shaft of the drum-contained motor, such crank shaft having two oppositely disposed eccentric bearing surfaces each of which is disposed in carrying relationship relative to an identical toothed wheel, each wheel having a like predetermined number of external teeth and being also restrained from rotational motion with the crank shaft by a plurality of shaft-carried elongated rollers stationarily supported by the frame structure and passing through equally spaced-apart and commonly radiused holes formed therein.

Still a further aspect of the preferred embodiment of the invention is the fact that each of the equally spaced-apart and commonly radiused holes formed in the toothed wheels is provided with a diameter equal to the diameter of the elongated roller passing therethrough, plus twice the eccentric distance between the center of the bearing surface carrying the wheel and the center of the motor shaft, the restraining effect of the elongated rollers passing through corresponding holes formed in the toothed wheels serving to impart an eccentric, non-revolving motion to the wheels relative to the inner cyindrical surface of the drum as the crank shaft is rotated by the motor.

Yet another important aspect of the invention is the provision of a toothed output ring secured to the inner cylindrical surface of the drum, such ring being provided with a predetermined greater number of internal teeth than the predetermined number of external teeth disposed along the periphery of each toothed wheel, the internal teeth of the output ring being engageable by the external teeth of both of the toothed wheels, as the wheels are positionally carried by the bearing surfaces of the eccentric crank shaft, to thereby convert the eccentric, non-revolving motion imparted to the toothed wheels by the eccentric crank shaft into a rotational motion of the drum.

BRIEF DESCRIPTION OF THE DRAWING

These and other objects, aspects and advantages of the invention will become apparent from the following description with reference to the accompanying drawing figures in which like parts and elements bear identical reference characters, and wherein.

DESCRIPTION OF THE PREFERRED EMBODIMENT

The invention resides in the provision within a cylindrical drum of the type commonly employed in belt conveyor systems, of an electric motor and motor shaft, a crank shaft having a pair of oppositely and eccentrically disposed bearing surfaces coupled to the motor shaft, a pair of identical externally toothed wheels carried by the pair of eccentrically disposed bearing surfaces of the crank shaft, and an internally toothed output ring fixed to the inner cylindrical surface of the drum in cooperating relationship with the pair of externally toothed wheels, an exteriorly anchored frame structure also disposed within the drum serving to provide stationary support to the motor and rotational support to the motor shaft and crank shaft, and serving also to restrain the pair of externally toothed wheels against rotation as the motor shaft and crank shaft rotate, rotation of the eccentric crank shaft thereby imparting an eccentric, non-revolving motion to the externally toothed wheels whereby the internal teeth of the output ring are sequentially engaged to thereby rotate the output ring and the drum. Pertinent to the above-described inventive arrangement is the fact that the pair of identical externally toothed wheels are of lesser diameter than the diameter of the internally toothed output ring, and that each of the wheels is provided with a lesser number of teeth than the output ring, the distance of rotation of the drum per revolution of the motor shaft and crank shaft depending upon the excess of the number of teeth of the ring over the number of teeth of the wheels.

Figure 1:
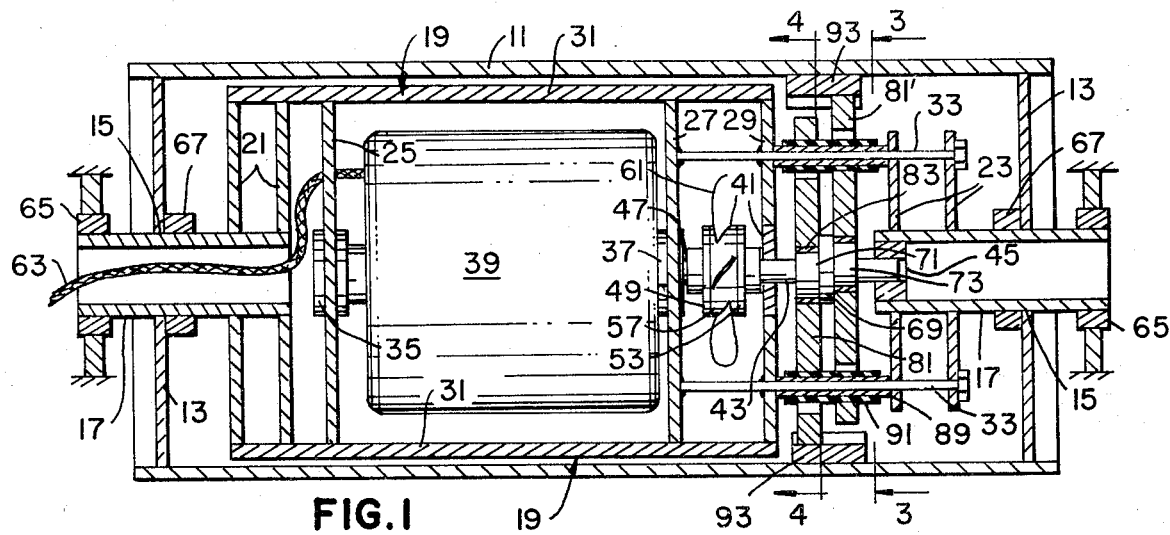
FIG. 1 is a sectioned elevational view showing the arrangement of the frame structure, motor, eccentric crank shaft and toothed wheels disposed on bearing surfaces thereof, the wheels being disposed in cooperating relationship relative to an output ring.
Figure 5:
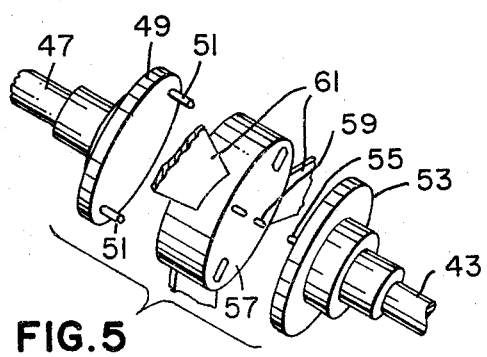
FIG. 5 is an exploded perspective view of preferred means for coupling the eccentric crank shaft to the motor shaft.

As illustrated in FIG. 1, the preferred embodiment of the invention provides a cylindrical drum 11 having a pair of end walls 13. Each of the end walls 13 is provided with a central aperture 15 through which a hollow stub shaft 17 extends, the pair of stub shaft 17 forming an integral part of an internal frame structure generally designated at 19. The leftmost stub shaft 17 is integrally formed with a pair of vertically disposed frame plates 21, and the rightmost stub shaft 17 is integrally formed with a pair of vertically disposed frame plates 23. Also forming a part of the internal frame structure 19 are vertically disposed frame plates 25, 27 and 29, a plurality of horizontally disposed connecting members 31 (only two of which are shown), and a plurality of four horizontally disposed connecting rods 33 (only two of which are shown), the connecting members 31 providing rigidity to and connecting the vertical plates 21, 25, 27 and 29, and the connecting rods 33 providing rigidity to and connecting the vertical plates 23, 29 and 27. The vertical plates 25 and 27 supportably house a pair of motor mounts 35 and 37, to thereby provide rigid stationary support for an electric motor 39, and the vertical plate 29 is provided with a bearing mount 41 effective for rotatably supporting the left end of a hereinafter described eccentric crank shaft 43. The right end of the crank shaft 43 is rotatably supported by a bearing mount 45 which is press-fitted into the inboard extremity of the rightmost stub shaft 17. The crank shaft 43, rotatably supported by the bearing mounts 41 and 45, may be coupled to a motor shaft 47 of the electric motor 39 by any suitable means, as for example by means of the coupling illustrated in FIG. 5 wherein a disk 49 having a pair of studs 51 displaced 180° from one another is fixed to the end of the motor shaft 47, and a disk 53 having a pair of studs 55 displaced 180° from one another is fixed to the leftmost extremity of the crank shaft 43, a cylindrical collar 57 having radially elongated apertures 59 displaced 90° from one another in conformity with the placement of the studs 51 and 55 on the disks 49 and 53, being couplingly interposed between the disks 49 and 53. The cylindrical collar 57 may additionally be provided with two or more fan blades 61 for changing the air within the cylindrical drum 11, and for air cooling the motor 39.

As illustrated in FIG. 1, current for the electric motor 39 is supplied by means of a supply cord 63 which is connected to the electric motor 39, passes through an aperture formed in the vertically disposed frame plate 25, and exits from the cylindrical drum 11 through the leftmost hollow stub shaft 17. The above-described unitary internal frame structure generally designated at 19 in FIG. 1 may be secured in a stationary position within the drum 11 by any suitable exterior means effective for grippably cooperating with the outboard extremities of the leftmost and rightmost stub shafts 17, as for example by means of stationary set collars represented by the reference character 65 in FIG. 1. As also illustrated in FIG. 1, each of the end walls 13 of the cylindrical drum 11 is provided with a bearing mount 67 disposed in fixed relationship relative to the inner surface thereof, such bearing mounts 67 being rotatably cooperable with the outer surfaces of the stub shafts 17 to thereby permit the rotation of the drum 11 independently of the stationary internal frame structure 19.

Figure 2:
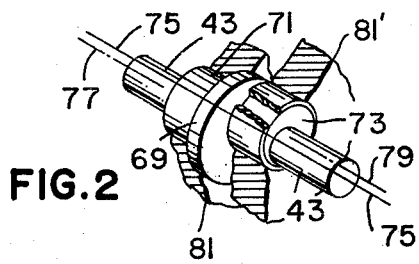
FIG. 2 is a perspective view of the bearing surfaces of the eccentric crank shaft, a solid center line representing the center line of the motor shaft, and two oppositely disposed broken lines representing the centers of the eccentric bearing surfaces.

The eccentric crank shaft 43 is comprised of a substantially central separator section 69 concentrically disposed relative to the center line of the motor shaft 47 and crank shaft 43, and a pair of eccentric bearing surfaces 71 and 73 disposed an equal distance on opposite sides of such center line (the center line being designated 75 in FIG. 2). In FIG. 2 the eccentricity of the bearing surfaces 71 and 73 from the center line 75 is represented by broken lines 77 and 79, respectively, the actual distance between the lines 75 and 77 and between the lines 75 and 79 being hereinafter referred to as the actual eccentricity of the crank shaft 43, and of the hereinbefore referenced pair of externally toothed wheels, such actual eccentricity being also hereinafter represented by the symbol $e_a$. The bearing surfaces 71 and 73 carry identical externally toothed wheels 80 and 81', respectively, as best illustrated in FIG. 1. Each of the wheels 81 and 81' is provided with a central aperture into which is press-fitted a sleeve bearing 83 the inner diameter of which is so dimensioned as to provide a running fit with its associated bearing surface 71 or 73. Each of the externally toothed wheels 81 and 81' is likewise provided with four radially displaced circular apertures 85, such apertures being disposed 90° apart and in contiguous relationship relative to the peripheral teeth thereof, such teeth being designated 87 in FIGS. 3 and 4. Each of the four circular apertures 85 of the toothed wheels 81 and 81' serves to receivably and operatively accommodate a corresponding one of the previously mentioned horizontally disposed connecting rods 33 of the stationary internal frame structure 19. As illustrated in FIG. 1, each of the connecting rods 33 is provided, in the area thereof interposed between the vertically disposed frame plate 29 and the leftmost of the vertical plates 23, with a bearing sleeve 89 having a running fit with its associated rod 33, and a resilient roller 91, the roller 91 being bonded to the bearing sleeve 89. The rollers 91 may be constructed of any durable resilient material such as urethane. It is to be emphasized that the outer diameter of the rollers 91 must bear a predetermined relationship to the diameter of the circular apertures 85 of the externally toothed wheels 81 and 81', it being essential that each aperture diameter be equal to the outer diameter of the roller 91 plus twice the eccentricity of the bearing surfaces 71 and 73 of the crank shaft 43 relative to the center line 75 of the motor shaft 47, which is to say the diameter of the circular apertures 85 must equal $(d + 2 E_a)$, where $d$ represents the diameter of the roller 91 and $e_a$ represents the actual eccentricity of the bearing surfaces as previously defined. In addition to the four radially displaced apertures 85 illustrated in FIGS. 3 and 4, the externally toothed wheels 81 and 81' may also be provided with additional apertures either for ventilation purposes or for load reduction on the bearing surfaces 71 and 73. The number of external teeth 87 provided along the periphery of the wheels 81 and 81' may vary according to the number of internal teeth provided in the hereinafter described output ring of the speed reducer, as also detailed at greater length in a later section.

Figure 3:
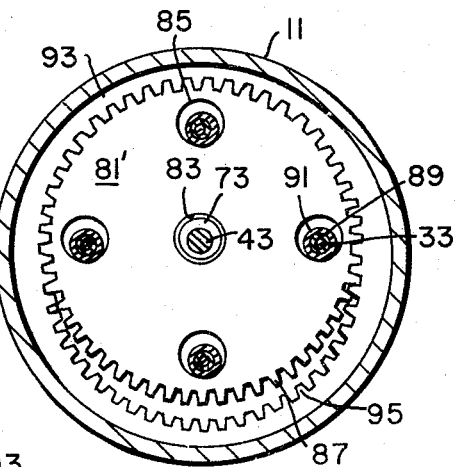
FIG. 3 is a view taken along the line 3—3 of FIG. 1 showing the rightmost toothed wheel of FIG. 1 with the upper range of its external teeth engaged with the upper range of the internal teeth of the output ring, and with the lower range of its external teeth disengaged from the lower range of teeth of the output ring.
Figure 4:
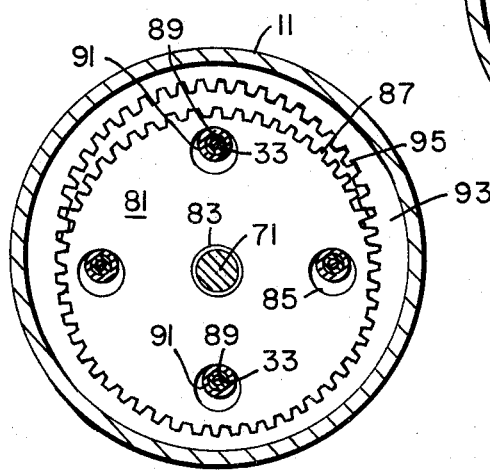
FIG. 4 is a view taken along the line 4—4 of FIG. 1 showing the leftmost toothed wheel of FIG. 1 with the upper range of its external teeth disengaged from the teeth of the output ring, and with the lower range of its teeth engaged with the lower range of teeth of the output ring.

As best illustrated in FIG. 1, the preferred embodiment of the invention also provides an internally toothed output ring 93 secured by any suitable means to the interior cylindrical surface of the drum 11 in cooperating relationship relative to the externally toothed wheels 81 and 81', such output ring being provided with internally formed teeth 95 of sufficient width to be engaged by the peripheral teeth 87 of both the wheels 81 and 81'. The output ring 93 may be constructed of any flexible, tough material such as urethane, and divided into two regions of distinctly different densities, an inner section of the ring encompassing the internal teeth 95 and a thin tooth-backing band, which may be likened to a thin timing belt, being constructed of solid urethane, and an outer section of the output ring, outwardly adjacent the thin tooth-backing band, being composed of low density, cellular urethane. In view of the sponge-like composition of the outer section of the output ring and the solid urethane composition of the inner section thereof, it can be seen that the belt-like inner section will assume a constantly changing oval configuration as the eccentric crank shaft 43 is rotated by the motor 39, such rotation of the crank shaft 43, in view of the hereinafter described restraining effect of the connecting rods 33 and rollers 91 on the wheels 81 and 81', serving to impart an eccentric, non-revolving motion to the wheels 81 and 81'. FIGS. 3 and 4 are also illustrative of the fact that the output ring 93 must be provided with a greater number of internally formed teeth than the number of externally formed teeth 87 provided along the periphery of the externally toothed wheels 81 and 81', such excess number depending upon the speed reduction desired and upon the hereinafter described pitch selection.

From the above description of the rotatable eccentric crank shaft 43 and the disposition of the connecting rods 33 and rollers 91 in the predeterminedly dimensioned radially displaced apertures 85 of the pair of externally toothed wheels 81 and 81', it can be seen that the rods 33 and rollers 91 will restrain the toothed wheels 81 and 81' against rotation with the supporting bearing surfaces 71 and 73 of the crank shaft 43, rotation of the motor shaft 47 and the crank shaft 43 thereby imparting an eccentric, non-revolving motion to the wheels 81 and 81', such eccentric motion, produced by the eccentricity of the bearing surfaces 71 and 73 and permitted by the diameters of the apertures 85, serving to sequentially engage the external teeth 87 of the wheels 81 and 81' with the greater number of internal teeth 95 of the output ring 93, each revolution of the crank shaft 43 thereby imparting a predetermined rotation to the output ring 93 and the drum 11, such predetermined rotation being equivalent to the distance represented by the excess number of teeth 95 of the output ring over the number of teeth 87 of the wheels 81 and 81'.

The formation of the teeth 87 of the wheels 81 and 81', and the teeth 95 of the output ring 93 should be based on good timing belt practice, with a pitch no greater than 2 $e_t$, where $e_t$ is the theoretical eccentricity of the bearing surfaces 71 and 73 of the crank shaft 43 and of the wheels 81 and 81'. Given a value of $e_t$ of 0.0625 inches, for example, a pitch requirement of 2 $e_t$ or 0.125 inches would be presented. With this pitch requirement and a given inner drum circumference of 18.250 inches, for example, a value of N (number of teeth on the output ring) could be determined by dividing the inner drum circumference by the pitch requirement (18.250 ÷ 0.125), or 146 teeth for the output ring 93. Given the number of teeth to be provided the output ring 93, the number of teeth to be provided each of the wheels 81 and 81', to thereby provide any desired speed reduction, could then be calculated by means of the equation $R_s$ equals (N/N—n), where $R_s$ is the desired ratio of shaft speed to drum speed, where N equals the number of teeth of the output ring, and $n$ equals the number of teeth of the wheels 81 and 81'. For a desired $R_s$ value of 73, for example, with an N value of 146, a value of $n$ of 144 teeth could be calculated from the above equation. With an $n$ value of 144 teeth and a pitch requirement of 0.125 inches, a wheel circumference of $n \times p$ or 18.0 inches can be calculated, with a wheel diameter of 5.73 inches ($18.0/\pi$).

Although the above-described preferred embodiment of the present invention calls for the provision of internal teeth 95 on the output ring 93, and external teeth 87 on the wheels 81 and 81', a separate embodiment of the invention, which would be suitable for the transmission of light drum loads, would eliminate the internal teeth 95 of the output ring 93 and the external teeth 87 of the wheels 81 and 81', a tire of urethane being substituted for the external teeth 87 on the periphery of the wheels 81 and 81', and a strip of solid urethane being substituted for the internal teeth 95 along the inner periphery of the output ring 93.

While a preferred embodiment of the invention has been shown and described in considerable detail, it will be apparent that other adaptations and modifications may be made by one skilled in the art without departing from the true spirit and scope of the invention.

What is claimed is:

1. In-drum drive and speed reducer apparatus for use within a cylindrical rotatably mounted drive drum in belt drive installations and the like, said apparatus being effective for rotatably driving the drum and a transport belt held in frictional contact therewith, said apparatus comprising:
   a. an electric motor stationarily disposed within said drive drum, said motor being provided with a pair of motor mounts and having a motor shaft and a supply cord connected to opposite ends thereof,
   b. a rotatably mounted eccentric crank shaft coupled to said motor shaft and supporting a pair of identical and correspondingly apertured pulley-like wheels carried thereby, said wheels being disposed in predetermined equal but opposite eccentric relationship relative to the center line of said motor shaft and said crank shaft,
   c. a flexible output ring comprised of two sections of distinctly different densities including an inner band-like section composed of a high density material and an outer compressible section composed of a low density compressible material, said inner section being disposed in cooperating relationship relative to the peripheries of said pair of wheels and said outer section being fixed to the inner surface of said drive drum,
   d. means providing drivable cooperation between said pair of apertured wheels and said high density inner band-like section of said flexible output ring, said cooperation extending for at least 180° of the peripheries of each of said wheels and presenting said inner band-like section of said output ring with an obround configuration as accommodated by the low density material of said outer compressible section of said flexible output ring, and
   e. stationarily disposed means associated with the apertures of said pair of apertured wheels for restraining said wheels against rotation with said eccentric crank shaft, whereby each complete revolution of said motor shaft and said eccentric crank shaft imparts an eccentric non-revolving motion to said pair of wheels and said cooperation between said wheels and said inner band-like section of said flexible output ring serves to rotate said drive drum a predetermined rotational distance.

2. The apparatus defined in claim 1 wherein said low density material of said outer compressible section of said output ring is cellular urethane, and wherein said high density material of said inner band-like section of said output ring is solid urethane.

3. The apparatus defined in claim 2 wherein said means providing drivable cooperation between said pair of apertured wheels and said inner band-like section of said flexible output ring comprises:
   a. a determined plurality of externally formed teeth disposed on the peripheral surfaces of said pair of apertured wheels, and
   b. a predetermined plurality of internally formed teeth integrally formed on the inner surface of said inner band-like section of said output ring, said predetermined plurality of internally formed teeth being in excess of said predetermined plurality of externally formed teeth by a determinable amount according to the desired speed reduction to be achieved by said apparatus.

4. The apparatus defined in claim 3 wherein said excess of said predetermined plurality of internally formed teeth over said predetermined plurality of externally formed teeth for any given desired speed reduction may be determined by means of the equation, $$R_s = (N/N-n),$$

where $R_s$ represents motor shaft speed to drum speed, where $N$ represents the number of internally formed teeth on the inner band-like section of said output ring, and where $n$ represents the number of externally formed teeth on each of the pair of apertured wheels.

5. The apparatus defined in claim 2 wherein said means providing drivable cooperation between said pair of apertured wheels and said inner band-like section of said flexible output ring comprises a tire of urethane fixed to the peripheral surface of each of said pair of apertured wheels, said urethane tires cooperating frictionally with the inner surface of said solid urethane inner band-like section of said output ring.

* * * * *